C. A. BACON.
MECHANISM FOR RAISING AND LOWERING WORKING DEVICES OF AGRICULTURAL IMPLEMENTS.
APPLICATION FILED JULY 5, 1918.
1,400,342.
Patented Dec. 13, 1921.
3 SHEETS—SHEET 1.
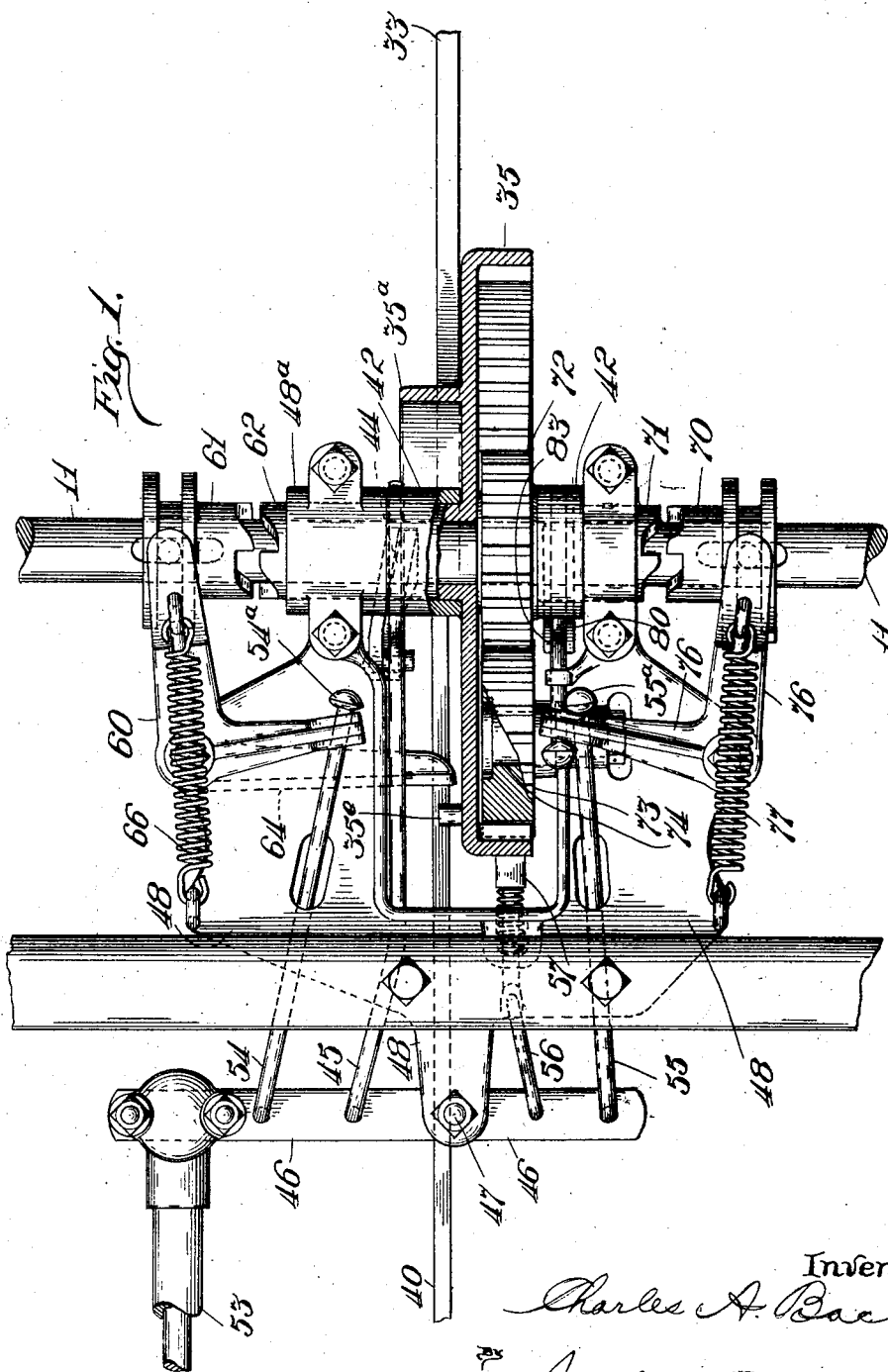

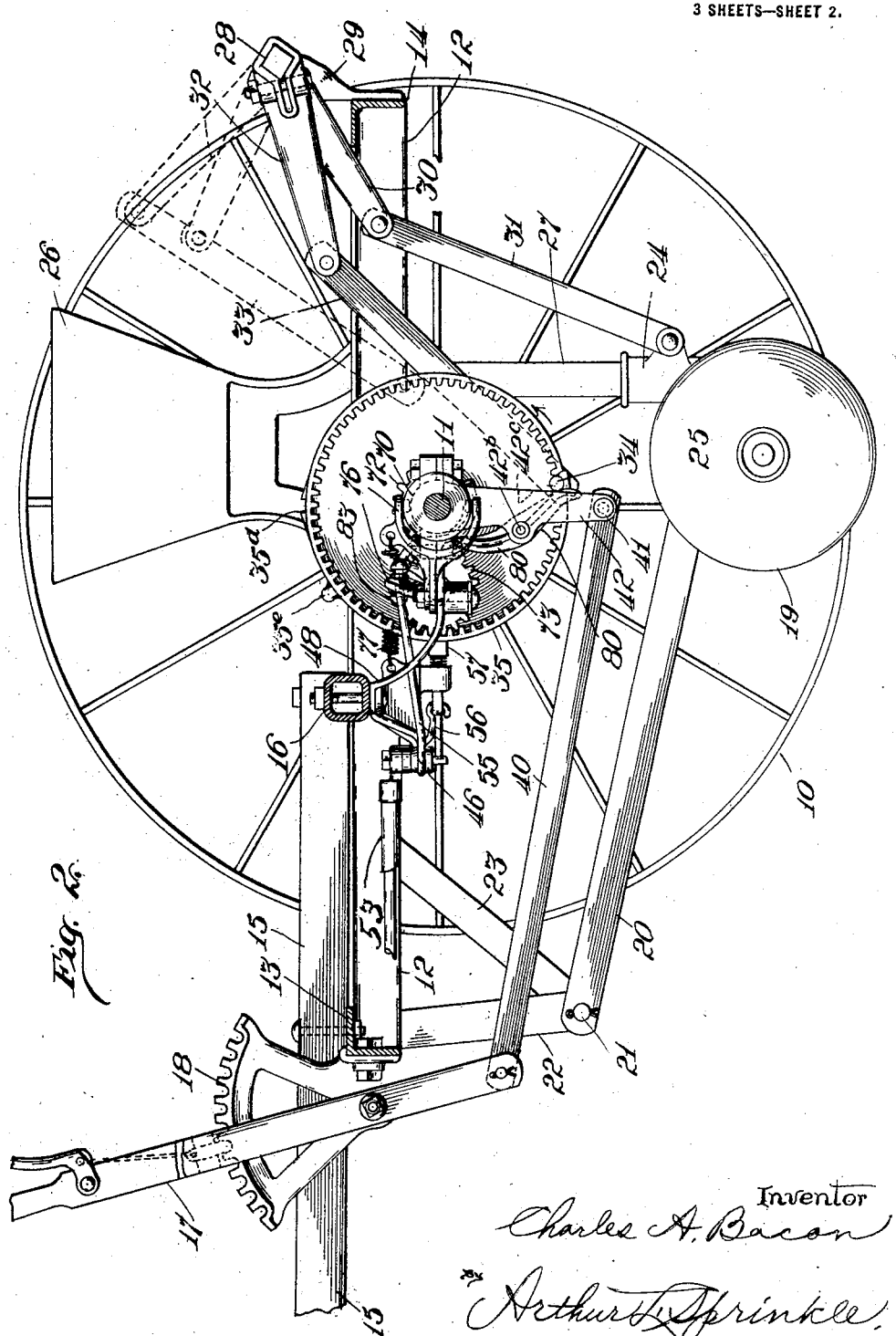

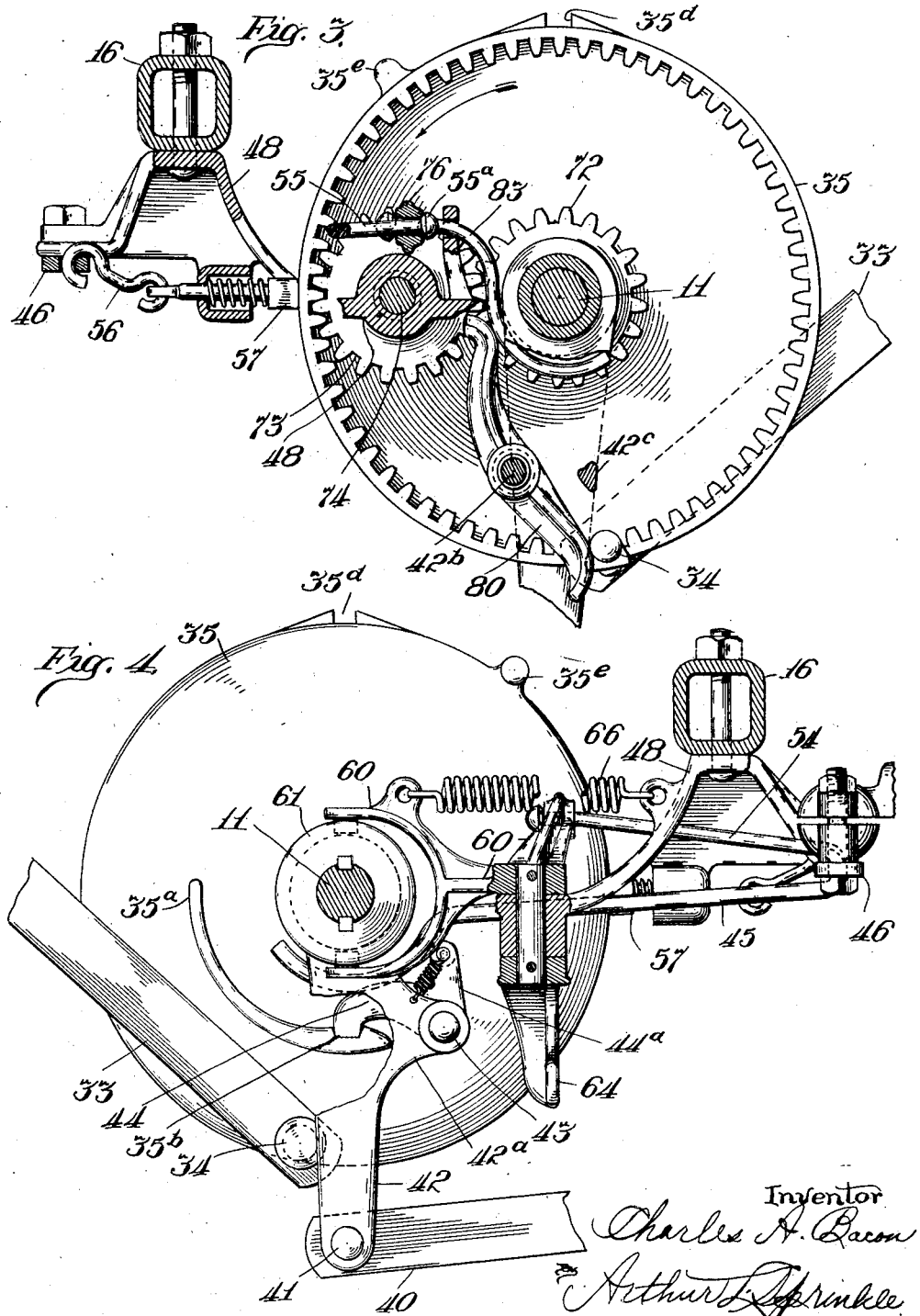

UNITED STATES PATENT OFFICE.

CHARLES ALLEN BACON, OF SOUTH BEND, INDIANA.

MECHANISM FOR RAISING AND LOWERING WORKING DEVICES OF AGRICULTURAL IMPLEMENTS.

1,400,342.     Specification of Letters Patent.     Patented Dec. 13, 1921.

Application filed July 5, 1918. Serial No. 243,327.

*To all whom it may concern:*

Be it known that I, CHARLES ALLEN BACON, a citizen of the United States, residing at South Bend, in the county of St. Joseph and State of Indiana, have invented certain new and useful Improvements in Mechanism for Raising and Lowering Working Devices of Agricultural Implements, of which the following is a specification.

The invention relates to mechanism for raising and lowering the working devices of agricultural implements and is herein applied to seeding machines, for the purpose of providing automatic or power lift devices for operating the markers or furrow openers of such machines, although it will be apparent that my improved raising and lowering mechanism is equally well adapted for operating the tools or working devices of many types of agricultural implements in which the tools or working devices are adapted to be raised and lowered synchronously, such as cultivators, gang plows and the like.

It is well known that with the present tendency to extend the use of all power draft devices of large units such as gasolene and steam tractors to farm purposes has made it possible and practical to construct seeding machines and other implements of large capacity. In fact, the only limitation there may be to the width of power drawn seeding machines is the necessity for keeping such machines down to a width where it is practical to transport them through gates or over bridges and the like. There is another difficulty that has arisen in the practical operations of seeding machines of exceedingly wide construction and that resides in the necessity of providing means for raising and lowering the markers or furrow openers that may be within the power of the driver or operator of the machine to manipulate. Obviously, therefore, there is necessarily a limit to the width of seeding machines since the multiplication of the number of furrow or marker mechanisms will result in the production of a weight that may be impractical for a man to raise and lower, which he must of necessity do in turning the machines at the ends of fields or at corners or for transportation purposes. Obviously the same is true of plows, cultivators and analogous implements.

It is therefore the primary object of the present invention to provide improved means which may be set in motion by the operator from his position either upon the agricultural implement or from a position upon the draft machine as upon a tractor, whereby the draft power of the machine may be utilized for the operation of raising the furrow openers or other working devices.

Other objects of the invention will appear as described in the following specification and shown in the accompanying drawings forming a part thereof, and as pointed out more particularly in the appended claims.

In the said drawings Figure 1 is a top plan view of the invention with parts of the seeding machine broken away and parts of the device in section to disclose the details thereof.

Fig. 2 is a side elevation of a seeding machine showing the invention applied thereto with parts broken away to better disclose the details of construction of the parts more closely associated with the invention.

Figs. 3 and 4 are enlarged broken detail views illustrating details of construction of the apparatus embodying the invention.

One of the ground wheels of which there are two, is designated by the reference character 10, Fig. 2 and these ground wheels are secured to rotate with the axle 11. The axle 11 supports a frame which includes suitable side members 12, one at each side of the machine adjacent each of the ground wheels 10. The axle is rotatably mounted in suitable bearings not shown, secured to the frame and the side members 12 are connected by transverse members, the forward one of which is indicated by the reference character 13 and the one at the rear by the reference character 14. The draft member or tongue of the machine is designated by the reference character 15 and is secured to the transverse front frame member 13 as indicated by a retaining bolt and extends thence rearwardly where it is anchored to the transverse tie-beam 16, the latter extending transversely of the main frame between the side members 12, and being securely anchored thereto. The draft member or tongue 15 may be utilized in the usual manner to attach draft animals to the machine or it may be suitably formed to receive devices for coupling the seeding machine with a draft device, as a gas, gasolene or steam tractor. When seeding machines of this type are drawn by a tractor the driver or operator is ordinarily located upon the frame of the tractor adjacent the draft devices on the tractor and on the seeding machine so that such position would put the driver within convenient reach of the operating lever 17, which is pivoted to the lever segment frame 18 mounted upon the front of the main frame. The markers or furrow openers indicated generally by the reference character 19 are connected forwardly by means of draw links 20 to a suitable anchor bar 21 supported by any desired number of depending brackets as indicated by the reference characters 22 and 23, Fig. 2, which latter are secured to the front side of the main frame. The furrow opener or marker as illustrated herein consists of a suitable feed chute 24, the latter serving also as a frame or support for the rotating disk 25. Obviously, the marker or furrow opener may be constructed according to any desired practice, such as single or double disks or hoe or shoe marker and the specific construction of the furrow openers or markers forms no part of the present invention which is adapted to operate markers or furrow openers or working devices of any desired construction. In the machine upon which the invention is shown herein grain is dropped from the seed box 26 through tubes 27, there being one of such tubes to each marker. 28 is a rock shaft journaled in suitable bearings in brackets 29 on main frame 14. Rigidly secured to rock shaft 28 are a plurality of rocker arms 30, there being one of such rocker arms 30 for each of the individual marker or furrow opener devices found on the particular machine. 31 is a link pivotally connected at its upper extremity with one of the rocker arms 30 and at the lower end with a marker or furrow opener 19. In the present embodiment of the invention the connecting link 31 is indicated as of solid construction although it will be obvious that the same may be of a telescoping spring controlled construction as commonly employed for holding markers or furrow openers downwardly in their operative position under spring pressure. The markers or furrow openers are controlled from rock shaft 28 through arms 30 and links 31, just described so that each marker or furrow opener may be synchronously raised so that they will clear the ground or surface over which the seeding machine is passing or they may be lowered to the operative position for the purpose of opening furrows for the deposit of seed as shown by the position of the parts for example in Fig. 2. In order to operate the rock shaft 28 automatically from the draft power of the seeding machine an arm 32 rigidly secured to the shaft 28 is provided with a link connection 33, which in turn is pivotally connected to crank pin 34 on the exterior of a gear casing 35, which is mounted upon the main drive shaft 11. The mechanism to be presently described operatively connects the internal gear casing 35 with the drive shaft 11 so that when such mechanism is operated the rotation of the gear casing 35 with the main supporting wheels 10 of the seeding machine will cause the internal gear casing 35 to rotate in an anti-clockwise direction, until the gear casing will have brought the crank pin to the position shown in Fig. 2 where the link 33 shown in dotted lines has elevated the arm 32 and by its action upon rock shaft 28 has brought the markers or furrow openers to the elevated position of these parts shown in dotted lines.

If for any reason it is desired to raise or lower the markers or furrow openers by hand this may be accomplished in the construction illustrated by shifting of the hand lever 17, which is connected through a link 40 at 41 with a pivoted bifurcated member or lever 42 the latter being mounted to rotate concentrically with the main drive shaft 11 and positioned so that its bifurcated portions extend on each side of the gear casing 35. The lever 42 Fig. 4, carries a projection 42$^a$ on one of its branches upon which at 43 is pivotally connected a latch 44 having an angular projecting arm 44$^a$ lying adjacent the curved end of a rod 45 (Fig. 1) which is connected to the operating lever 46, pivoted at 47 to a projecting portion of the supporting plate or frame designated generally by the reference character 48, the latter being of an irregular shape and suitably formed to support the various parts of the operating mechanism for controlling the mechanism for automatically operating the markers or furrow openers. The connection between the operating rod 45 and the trip latch 44 is such that the latch 44 by gravity or by reason of the tension of spring shown in Fig. 4 normally tends to engage with the flanged portion 35$^a$ formed on the exterior of the web of the gear casing 35. The web 35$^a$ is provided with a notch as indicated at 35$^b$, Fig. 4, so that latch 44 on bifurcated arm 42 will engage the notch 35$^b$ locking arm 42 and the gear 35 together. With the parts thus connected obviously any motion being imparted to the link 40 through hand lever 17 will result in rotation of the gear 35 in an anti-clockwise direction with the result that the link connection 33 will operate arm 32 and rock shaft 28 so that the markers or furrow openers 19 will be raised through the arms 30 and connecting links 31 as indicated by the dotted line portions of the various parts in Fig. 2, thus effecting ordinary manual operation of the markers or furrow openers independently of the automatic mechanism comprised in the invention.

Under normal conditions of operation the functions of the hand lever 17 and its connections with lever 42 is for the purpose of depth adjusting of the markers or furrow openers, since the lever 17 is preferably provided with a releasable latch as shown adapted to coöperate with the teeth in the segment 18. The manner in which the lever 17 may be manipulated for depth adjusting of the markers or furrow openers will be referred to in the further description of the automatic operating devices. The pivoted lever 46 heretofore referred to for operating the controlling mechanism may be operated manually by any suitable connection from the driver's seat either on the seeding machine or on the draft machine, as a tractor, a portion of such connection being indicated in the drawings, Figs. 1 and 2 by the reference character 53. Connected with the operating lever 46 in addition to the trip release rod 45 heretofore referred to there are other connecting rods for operating various parts of the mechanism, namely, the clutch operating connecting rods 54 and 55 and a connection 56 leading to spring controlled pawl 57, which latter is adapted to engage with the peripheral notch 35$^d$ in the gear casing 35 and lock the same in relation to the supporting frame 48 since the locking pawl 57 is mounted therein. The connection 54 extends to a clutch shifter in the form of a bell crank as indicated by the reference character 60, there being a slip connection between the rod 54 and one arm of the bell crank formed by passing the rod through an eye upon one arm of the bell crank and enlarging the extremity or head of the rod 54 as indicated at 54$^a$. Associated with bell crank 60 and controlled thereby is the sliding clutch member 61 provided with clutch teeth for engaging similar teeth on a sleeve 62 which is rotatably mounted around the main drive shaft 11 within a suitable bearing 48$^a$ on the frame 48. The clutch sleeve 62 is preferably formed integrally with the gear casing 35 or is connected in a fixed manner therewith and serves as the hub of the gear casing by which it is rotatably mounted on the main drive shaft 11. When the clutch member 61, which is fixed to rotate with the main drive shaft 11 being slidably mounted thereon, engages with the hub portion 62 of the gear casing 35, obviously the gear casing will be rotated synchronously with the main drive shaft and in the same direction therewith. Since the drive shaft 11 will normally rotate in an anticlockwise direction as the mechanism is shown in Fig. 2, obviously the function of the clutch members 61 and 62 with their operating connections is to connect the gear casing with the drive shaft 11 for the purpose of elevating or raising the markers or furrow openers.

For the purpose of operating the rock shaft 28 in the reverse direction to permit the lowering of the markers or furrow openers obviously the gravity of the parts and loose connections between the marker elevating mechanism and the driving mechanism of the machine might be employed and in fact is employed to an extent in the beginning of the lowering operation of the markers or furrow openers, but it is a feature of my invention to utilize positive lowering mechanism and consequently the weight of the machine for the purpose of forcing the markers or furrow openers under considerable pressure into the ground in order to enable the markers to properly penetrate the seed bed and to the depth required during the drilling operation. It will be seen that the mechanism just described for elevating the markers operates at substantially the same rate of speed as the travel of the main drive shaft, which is found to be satisfactory for practical operation and the fact that the lifting devices are so operated by direct connection with the driving axle enables the marker gang to be raised to full height rapidly each time and no matter at what depth the markers may be penetrating they will be lifted full height during the normal operation of the gear casing 35 upon being connected through its clutch mechanism with the driving shaft. The rotation of gear casing 35 will carry the notch 35$^d$ in the periphery thereof into engagement with the spring pressed pawl 57 which will obviously be released so that it can be acted upon by its controlling spring whenever the clutch members 61 and 62 are in engagement. The rotation of the gear casing 35 through approximately an arc of ninety degrees will therefore cause the same to be locked under control of the spring pressed pawl 57. The bell crank lever 60 for operating the clutch 61 is provided with a fixed or integral arm 64 which has an extension thereon normally lying in the path of a lug 35$^e$ projecting from the back face of the gear casing 35.

When the lug 35$^e$ engages the arm 64 of the bell crank lever 60 and thus shifts the clutch 61 out of engagement with the clutch 62 stopping the rotation of the gear casing 35 and the consequent elevation of the marker or furrow opener gang, the pawl 57 under the control of its spring will coöperate with the notch 35$^d$ on the rim of the gear casing 35 and lock it in this position thus securing the furrow opener or marker gang in the raised position. The gear shifter lever 60 it should be noted is under the control of spring 66 which operating over dead center will both hold the clutch 61 in and out of gear.

When it is desired to lower the marker or furrow opener gang a reverse movement of the operating lever 53 and the pivoted operating lever 46 will shift the connection 56 releasing pawl 57 and by gravity the gangs will start toward the ground and will ordinarily reach the ground just before the clutch operates. Slidably mounted on the drive shaft 11 is the clutch member 70 but splined to the shaft so that it rotates constantly therewith. The clutch member 70 coöpeartes with clutch member 71 which is in the form of a sleeve surrounding drive shaft 11 and extending into the interior of the internal gear casing 35, having fixed thereto on the interior of the gear casing the spur gear 72 in engagement with a spur gear 73 meshing therewith and rotatably mounted on a stud 74 which is secured in the supporting frame 48 and in turn meshes with the internal gear teeth of the rotating gear casing 35. Obviously, the gears 72 and 73 coöperating with the internal gear teeth of the casing 35 will impart rotation to the casing 35 in the reverse direction of the normal rotation of the drive shaft 11 and in the reverse direction from its movement previously described under the control of the clutch member 61 and 62 thus providing means for rotating the gear casing 35 and the marker or furrow opener gang controlling mechanism in the downward direction and furthermore permitting the positive operation of the gang downwardly upon reaching the ground to insure the proper depth adjustment even though necessary to force the markers into hard ground. The clutch member 70 is operated through the bell crank shifter 76 which is pivotally mounted on the frame 48 and controlled by means of the spring 77 in both its operative and inoperative positions so that the clutch member 70 will be held either in the engaging or disengaging positions under spring pressure as in the case of the clutch member 61, previously described. The link connection 55 passes through an eye or opening in the free arm of the bell crank shifter 76 having on its extremity the enlarged portion 55ᵃ for securing the link to the bell crank and permitting at the same time a slip connection thus making it possible for the operation of the link 55 to cause the member 70 to engage but being ineffective to disengage the clutch, the latter operation being accomplished by other mechanism which will now be described.

Pivoted on the arm 42 at 42ᵇ is a trip dog 80 having an extension or tail piece adapted to be engaged by some suitable part near the periphery of the gear casing 35, as for example the pivot pin 34, which secures the connecting rod 33 to the gear casing. When the gear casing therefore has reached the position where the marker or furrow opener gang has been forced down into the seed bed to the desired depth under the pressure of the weight of the machine, which is multiplied about two and one half times by reason of the smaller spur gears 72 and 73 connected with the main driving shaft which operate the large internally toothed gear casing, the trip dog 80 will be caused to contact with the conecting rod 83 and by exerting a pull thereupon will operate the gear shifter bell crank 76 to cause the clutch member 70 to become disengaged from the clutch 71.

It will be seen that the lever arm 42 which carries the trip dog 80 is under the control of the lever 17 and the position therefore at which the positive operation of the gang in the downward direction will be stopped is under the control of the operator by the manipulation of the adjusting lever 17.

It will be apparent from the above description that the larger portion of all the devices used in the control of the gang in the raising, lowering and adjusting operation are intimately connected with or included within the internally geared rotatable gear casing 35 insuring compactness of mechanism and ease in timing together with successful operation and having all these vital controlling devices connected with the same supporting structure insures the minimum amount of complications in joints, levers and the like and enables the device to have greater ease in operation and longer life.

In order that the invention might be understood the details of the preferred embodiment have been shown and particularly described but it is not desired to be limited to the mere details of construction for it will be apparent that persons skilled in the seeding machine art may resort to various modifications without departing from the purpose and spirit of my invention.

I claim:

1. The combination in an agricultural machine including a frame and a working device or tool, a wheel for supporting the frame, means operatively connected with the working device or tool for raising or lowering the same, comprising a gear, means operatively connecting said gear with said supporting wheel comprising double clutch mechanism for positively connecting said gear with said driving wheel to lift the working device or tool and to positively connect said gear with said driving wheel to drive said gear in the reverse direction to force said working device or tool downwardly, and means to render each of said clutch mechanisms inoperative when said working device or tool is at the limits of its movement in both raised and lowered positions.

2. The combination in an agricultural machine including a frame and a working device or tool, of a rotatable drive shaft journaled on the frame, wheels for supporting the frame and imparting movement to the said shaft, a rock shaft supported by the frame, an arm on the rock shaft, means for connecting said arm with the working device or tool, a gear, means for operating the rock shaft from said gear, mechanism under control of the operator for connecting said gear with said drive shaft to rotate therewith, and means also under control of the operator for connecting said gear with said drive shaft, so that the gear will be operated in a reverse direction from the normal movement of the said drive shaft.

3. The combination in an agricultural machine including a frame and a working device or tool, of a rotatable drive shaft journaled on the frame, wheels for supporting the frame and imparting movement to the drive shaft, a rock shaft supported by the frame, an arm on the rock shaft, means for connecting said arm with the working device or tool, a gear mounted to rotate concentrically of said drive shaft and supported thereby, mechanism under control of the operator for connecting said gear whereby it may be rotated with and by said drive shaft, and means also under control of the operator for connecting said gear with said drive shaft so that the gear will be operated in reverse direction from the normal direction of rotation of said drive shaft.

4 The combination in an agricultural machine including a frame and a working device or tool, of a rotatable drive shaft journaled on the frame, wheels for supporting the frame and imparting movement to the drive shaft, a rock shaft supported by the frame, an arm on the rock shaft, means for connecting said arm with the working device or tool, a gear having a hub portion mounted concentrically of said drive shaft and being provided with an internally toothed circumferential portion, means for operating the rock shaft from said gear, clutch mechanism under the control of the operator for connecting the said internally toothed gear casing to be rotated by and with said drive shaft, a train of gears interposed between said drive shaft and the internally toothed circumferential portion of said gear, said train of gears being on the interior of the gear, and clutch mechanism under the control of the operator for connecting and disconnecting said train of gears with said drive shaft so that movement may be imparted to the said gear from the drive shaft in reverse direction from the normal direction of movement of the drive shaft.

5 The combination in an agricultural machine including a frame and a working device or tool, of a rotatable drive shaft journaled on the frame, wheels for supporting the frame and imparting movement to the drive shaft, a rock shaft supported by the frame, an arm on the rock shaft, means for connecting said arm with the working device or tool, a gear, means for operating the rock shaft from said gear, a clutch for connecting said gear to rotate with the drive shaft, a train of gears for operating the first said gear in a direction opposite to the normal direction of rotation of the drive shaft, clutch mechanism for rendering said train of gears operative or inoperative, a pivoted lever, and connections between said clutch mechanisms and said lever, said connections being attached on opposite sides of the pivotal axis of said pivot lever, whereby the operation of the lever in shifting one of the connections to operate its corresponding clutch to the closed position will result in shifting the other connection to a position allowing sufficient lost motion to permit the shifting of the corresponding remaining clutch to the open or inoperative position 6. The combination in an agricultural machine including a frame, and a working device or tool, of a rotatable shaft journaled on the frame, wheels for supporting the main frame and imparting movement to the shaft, means operatively connected with the working device or tool for raising and lowering the same, a gear, connections between the raising and lowering means and said gear, clutch mechanism for connecting said gear to be rotated by and in the same direction as the drive shaft, a train of gears for operating the first said gear in a reverse direction to the normal direction of rotation to the drive shaft, clutch mechanism for rendering said train of gears operative or inoperative at will, a lever mounted to rotate concentrically of the axis of the said gear, a hand lever pivoted on the machine frame, connections between said hand lever and the said gear operating lever, a flanged portion on the gear having an offset portion therein for coöperating with a locking device, and a locking member carried by the gear operating lever for coöperating with the offset in the flanged portion whereby the tool operating gear may be operated by the hand lever.

7. The combination in an agricultural machine including a frame, and a working device or tool, of a rotatable drive shaft journaled on the frame, wheels for supporting the frame and imparting movement to the drive shaft, a rock shaft supported by the frame, an arm on the rock shaft, means for connecting said arm with the working device or tool, a gear mounted concentrically of the drive shaft, connections between the gear and the said rock shaft, clutch mechanism for connecting said gear to rotate with the drive shaft, a train of gears for operating said gear in a reverse direction to the normal direction of movement of the driving shaft, means for operating said gear by hand, clutch mechanism interposed between said train of gears and the said drive shaft, a controlling lever, connections between said controlling lever and the said clutch mechanisms for rendering either of said clutch mechanisms operative at will, and means for locking the said gear in position to hold the working device or tool in its lowered or operative position in the seed bed.

8. The combination in an agricultural machine including a frame and a working device or tool, of a rotatable drive shaft journaled on the frame, wheels for supporting the frame and imparting movement to the drive shaft, a rock shaft supported by the frame, an arm on the rock shaft, means for connecting said arm with the working device or tool, a gear mounted concentrically of the drive shaft, clutch mechanism for connecting said gear to rotate with the drive shaft, a train of gears for operating said gear in a reverse direction to the normal direction of movement of the drive shaft, a lever pivoted on the main drive shaft adjacent the gear, clutch mechanism interposed between the rotatable drive shaft and said train of gears, a trip arm on the last said lever, connections between the trip arm and the last said clutch mechanism, and means carried by the gear for engaging the trip arm to disengage the clutch.

9. The combination in an agricultural machine including a frame, wheels for supporting the frame and imparting movement to the drive shaft, a rock shaft supported by the frame, an arm on the rock shaft, means for connecting said arm with the working device or tool, a gear mounted concentrically of the drive shaft, connections between said gear and the said rock shaft, clutch mechanism for connecting said gear to rotate with the drive shaft for raising the working device or tool, a pivoted operating lever, connections between said pivoted operating lever and the said clutch mechanism for shifting the latter to its operative position, means carried by the said gear for rendering the said clutch mechanism inoperative, a train of gears for operating said gear in a reverse direction to the normal direction of movement of the driving shaft for the purpose of forcing the said working device or tool downwardly to an operative position under pressure, means operable from the said operating lever for locking the said gear to hold the said working device or tool in a raised position, a second clutch mechanism for connecting the said train of gears with the said drive shaft, means connected to the said operating lever for operating the second said clutch mechanism to the operative position, a pivoted lever upon the main drive shaft adjacent the working device or tool operating gear, a trip lever carried by said pivoted lever, connections between said trip lever and the last said clutch mechanism for releasing the clutch from operative connection with the main driving shaft, and means carried by the gear for engaging the trip lever to disengage the clutch.

10. The combination in an agricultural machine including a frame, a working device or tool, a rotatable drive shaft journaled on the frame, wheels for supporting the frame and imparting movement to the drive shaft, a rock shaft supported by the frame, an arm on the rock shaft, means for connecting said arm with the working device or tool, a gear mounted concentrically of the drive shaft, connections between said gear and the said rock shaft, clutch mechanism for connecting said gear to rotate with the drive shaft for raising the working device or tool, a pivoted operating lever, connections between said pivoted operating lever and the said clutch mechanism for shifting the latter to its operative position, means carried by the said gear for rendering the said clutch mechanism inoperative, a train of gears for operating said working device or tool in a reverse direction to the normal direction of movement of the drive shaft for the purpose of forcing the said working device or tool downwardly to an operative position under pressure, means operable from the said operating lever for locking the said gear to hold the said working device or tool in a raised position, a second clutch mechanism for connecting the said train of gears with the said shaft, means connected to the said operating lever for operating the second clutch mechanism to the operative position, a pivoted lever upon the main drive shaft adjacent the said gear, a trip lever carried by said pivoted lever, connections between said trip lever and the last said clutch mechanism for releasing the clutch from operative connection with the main driving shaft, means carried by the gear for engaging the trip lever to disengage the clutch, and means for adjusting the position of the lever pivoted on the drive shaft and carrying the clutch trip arm.

11. The combination in an agricultural machine including a frame and a working device or tool, a wheel for supporting the frame, means operatively connected with the working device or tool for raising or lowering the same, comprising a gear, means operatively connecting said gear with said supporting wheel comprising double clutch mechanism for positively connecting said gear with said driving wheel to lift the working device or tool and to positively connect said gear with said driving wheel to drive said gear in the reverse direction to force said working device or tool downwardly, means to render each of said clutch mechanisms inoperative when said working device or tool is at its raised or lowered positions, and means for locking said gear to hold said working device or tool in its adjusted raised or lowered positions upon the disengagement of said clutches.

12. The combination in an agricultural machine including a frame and a working device or tool of a rotatable drive shaft journaled on the frame, wheels for supporting the frame and imparting movement to the drive shaft, means for operating said working device or tool from the drive shaft comprising a gear operatively connected with the drive shaft, means for connecting said gear to rotate with said drive shaft, a train of gears interposed between said gear and said drive shaft whereby to reverse the direction of movements of said gear in relation to said shaft when said first mentioned connection between said shaft and gear is disengaged, means for locking said gear at the limits of its movement to hold said working device or tool in either of its raised or lowered positions, and an operative connection between said gear and said working device or tool.

13. The combination in an agricultural machine including a frame and a working device or tool of a driving wheel connected with said frame, a gear, means for driving said gear synchronously with said driving wheel, means for releasing said driving means, a train of gears interposed between said driving wheel and said gear for reversing the direction of movement of said gear in relation to said driving wheel, and an operative connection between said gear and said working device or tool.

14. The combination in an agricultural machine including a frame and a working device or tool of a driving wheel connected with said frame, a gear, means for driving said gear synchronously with said driving wheel, means for releasing said driving means, a train of gears interposed between said driving wheel and said gear for reversing the direction of movement of said gear in relation to said driving wheel, an operative connection between said working device or tool and said gear, and means for locking said gear to hold said working device or tool at the limits of its movement in both its raised and lowered positions.

15. The combination in an agricultural machine including a working device or tool of a rotatable drive shaft journaled in the frame, a rock shaft supported by the frame, an arm on the rock shaft, means for connecting said arm with the working device or tool, a gear, means for operating the rock shaft from said gear, a clutch for connecting said gear with said driving shaft, a train of gears interposed between said drive shaft and the first said gear, a clutch interposed between the drive shaft and said train of gears, a lever on the frame adapted for manual operation, connections between said lever and each of said clutches, locking devices for locking said gear at the limits of its movements with said working device or tool in its raised or lowered positions, and connections between said lever for manual operation of the device and each of said gear locking devices.

In testimony whereof I have signed my name to this specification.

CHARLES ALLEN BACON.